B. W. KADEL.
CAR TRUCK.
APPLICATION FILED MAY 26, 1916.

1,213,206.

Patented Jan. 23, 1917.
2 SHEETS—SHEET 2.

Witnesses
Fred W. Nover
A. K. Simmons

Inventor
B. W. Kadel

UNITED STATES PATENT OFFICE.

BYERS W. KADEL, OF ROANOKE COUNTY, VIRGINIA.

CAR-TRUCK.

1,213,206.        Specification of Letters Patent.        Patented Jan. 23, 1917.

Application filed May 26, 1916.   Serial No. 99,994.

*To all whom it may concern:*

Be it known that I, BYERS W. KADEL, a citizen of the United States, residing in Roanoke county, State of Virginia, have invented certain new and useful Improvements in Car-Trucks, of which the following is a specification.

The present invention pertains to car trucks and particularly to those having six wheels with three axles and the customary oil boxes on each end of an axle.

Among the objects of the same are to provide side members and bolster members of improved construction, improved means in connection with the truck side members for supporting the truck brakes and for providing a cable guard, also to provide improvements in truck side bearings and center bearings.

Other specific objects will appear as the present embodiment is described.

The invention consists in the novel construction and arrangement of car and truck parts as will be set forth.

In the accompanying drawings.

Referring to these drawings which show a preferred embodiment of my invention, it will be seen that the truck embraces a plurality of wheels 1 mounted upon axles 2 which are supplied with the customary oil boxes 3. Extending along each side of the truck are side frames 4 and 5, the frames 4 resting at their ends on the oil boxes of an end and of the middle axles, the frames 5 resting at one end on the oil boxes of the other end axle and overlapping the frames 4 at their other ends and resting thereon. The frames 4 and 5 are articulated with respect to each other and with respect to a horizontal plane, the transverse connecting pins 6 tying the frames together and forming the hinge point. The frame or frames 4 which are termed the "rigid" frames, are made bifurcated at their inner ends for a portion of their depth but not for their full depth there being a transverse wall of metal 7 connecting and tying together the side walls 8 and 9 at or near the bottom of the same. These side walls are spaced apart and accommodate therebetween the over-reaching end of the frame 5, there being some clearance provided between the walls 7 and the adjacent side of the frame 5 so as to allow the said articulation. The top member 10 of the frame 4 is made of channel shape in cross section with a substantially horizontal web 11 and vertical depending flanges 12. The web 11 and transverse member 7 may be said to merge together, the side walls 8 and 9 constituting upward extensions from the normally depending flanges 12. These flange extensions thus form a way for the movable accommodation therebetween of the over-reaching end of the frame 5.

The bearing of the frame 5 upon the frame 4 is made arcuate at 13, the center of the pin 6 being the center of the arc. In order to form this arcuate pocket the web 11 of the frame 4 is diverted from its normal path or convoluted, and the flanges 12 are at the same time extended upward to form side walls 14 for this pocket, the same being pierced transversely of the frame to accommodate the pin 6. Outstanding flanges 15 are provided on the outer faces of these side walls to stiffen the same, similar outstanding flanges 16 being also provided along the upper edges of the flange extensions or side walls 8 and 9. A bracket or brace 17 is provided between the channel flanges under the pocket at 13.

There is some lateral clearance provided between the walls 8 and 9 and the frame 5, and in order to limit the movement between these parts the one member, preferably the frame 5, is provided with pads or outward extensions 18 which contact the other frame. These are preferably located at a point removed from the pocket 13, and over the middle oil box, so that lateral forces will be delivered directly thereto.

In cases of derailment where the wheel at the outer end of the frame 5 drops below the rail the clearance between the wall 7 and the under side of the frame 5 may not suffice for the necessary articulation. The pierced hole 19 in the end of that frame for the pin 6 is elongated in a suitable direction so that if the frames contact there will be no binding but the inner end of the frame 5 may move along the slotted hole 19 and relieve any such binding.

The side frames are made with the customary bolster window openings 20 with top compression members 21 and bottom tension members 22, these latter forming spring seats. At the sides of the bolster openings are the vertical struts 23, and extending from over and under the bolster openings and converging at their ends are the top and bottom arch members 24 and 25, the same being tied together at their ends.

The arch members 24ª and 25ª for the inner end of the frame 5 are tied together by an additional tie member 26. The bottom member 25ª is bent out of a normal path at 27 and the diagonal tie 26 extends from this bend to the rigid junction of the member 21, the member 24ª and the adjacent member 23. Thus the inner end of the frame 5 is provided with a plurality of triangularly shaped openings, the one being defined by the bottom arch member 25ª, the adjacent strut 23 and the tie member 26, the other by the bottom arch member 25ª, the top member 24ª and the tie member 26.

The bolster construction consists of a pair of transverse members 27 and 28 which pass through the side frame window openings and are disposed along either side of the middle truck wheels. These support a longitudinal bolster member or center bolster 29, the center bolster being cast integral with one cross bolster at 30 and resting upon the other at the center of its length at 31 in a suitable window opening 32.

The cross bolsters are of I shape in cross section, the webs being vertical and there being normally horizontal top and bottom flanges. These cross bolsters rest on the springs 33 in the side frame window openings, the bottom flange of a bolster forming its spring seat or bearing. This spring seat is horizontal within the limits of the side frames and the bottom flange then drops downwardly toward the center of the truck. The top flange extends from its outer end on an upwardly inclined plane toward the center of the truck until inside of the side frame lines when it also drops downwardly so that at the center the entire cross bolster is depressed to accommodate the draft sills 34 of the car body which are usually secured under the car floor.

I am thus enabled to provide a cross bolster of great strength to withstand the heavy loads to which it is subjected. The cross bolster is also of I section with continuous and uninterrupted flanges extending from end to end. The opening 32 is located in the depressed portion of the cross bolster or where it has been formed out of a normal line, the longitudinal bolster seat being somewhat below the spring seat at the ends and the top flange of the depressed portion being substantially on line with the bottom flange at the spring seats.

The opposing sides 35 and 36 of the side frame bolster openings are flattened to form bolster guides, the inner edges 37 of the same being also shaped to serve as bolster stops. To coact with these, the ends of the bolster are provided with additional side walls 38 which extend vertically from flange to flange and are formed to tie together the flanges and coöperate with the faces 35 and 36, these walls terminating at their inner ends in angular portions which extend around and form coacting stops on the bolster for the stops 37. These walls are also extended below the spring seat face of the cross bolster so as to provide additional strength and wearing surface and hold the springs in alinement.

The window opening 32 in the cross bolster 28 is cut into the web of the same preferably without disturbing and weakening the flanges, and there is provided for a longitudinal bolster seat an additional horizontal flange 39 which is widened out at its center and disappears into the web of the I at each side of the opening 32. Vertical flange members 40 are placed along the edges of the web where it is cut away for this opening, the same extending from the flange 39 upwardly and defining the opening. Stiffening brackets 41 extend from the flange 39 down to the main bottom flange of the I.

The longitudinal bolster 29 consists of substantially parallel members 42 which extend longitudinally of the truck and between the draft sills of the car and the middle truck wheels. These are humped over the middle axle and are cast at one end at 30 into one piece with the cross bolster 27 which supports these ends at spaced points along its length. The parallel members converge at their other ends along angular lines 43 and are dropped down and curved inwardly under the draft sills and are joined together at the center line of the truck where the tapered end 44 of the longitudinal bolster passes within the window opening 32 of the cross bolster 28 and is supported thereby. The opening 32 in the cross bolster 28 is likewise made tapered or broader at the side adjacent the truck center and narrower at the opposite side. The end 44 of the longitudinal bolster is also tapered in depth within the limits of the opening 32, the opening being tapered to accommodate the same. Thus the end 44 of the longitudinal bolster may be greatly strengthened as it leaves the cross bolster.

Figure 1:
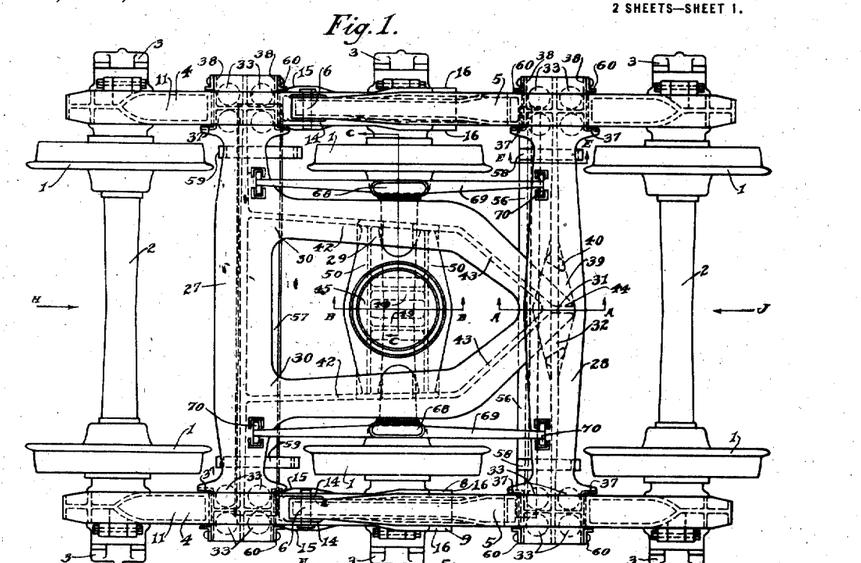
Figure 1 is a plan view of a truck embodying features of my invention and Fig. 2 a side elevational view of the same.
Figure 2:
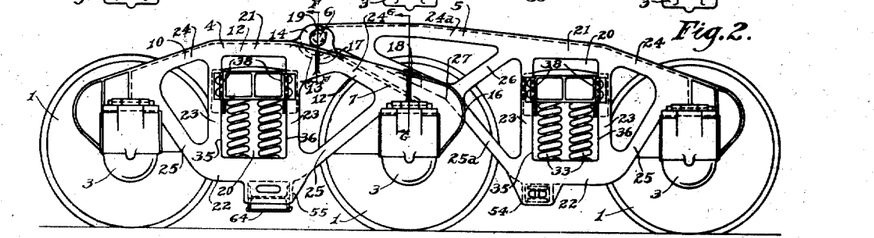
Figure 3:
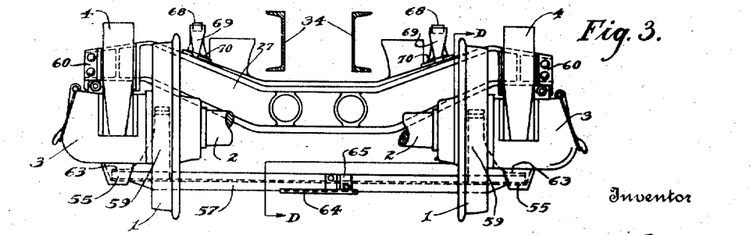
Fig. 3 is an end elevational view seen in the direction of the arrow H and Fig. 4 a similar view of the other end seen in the direction of the arrow J.
Figure 4:
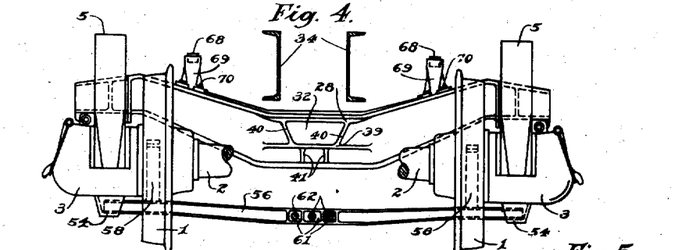
Figures 5, 6, 7, 8, 9, 10, 11:
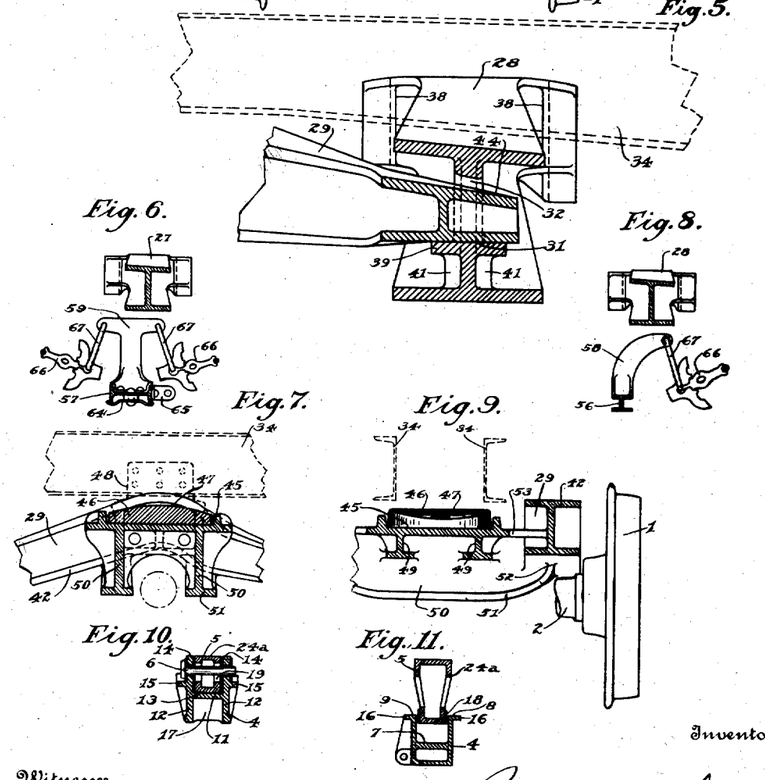
Figs. 5, 6, 7 and 8 are transverse vertical sections taken on the lines A A, D D, B B and E E respectively and each showing portions of the truck.
Fig. 9 is a broken transverse vertical section taken on the line C C of Fig. 1.
Figs. 10 and 11 are transverse vertical sections through the side frames, the same being taken on the lines F F and G G respectively of Fig. 2.

The cross bolsters 27 and 28 are formed at their central portions with the top flanges or faces thereof on an inclined plane longitudinally of the car, that is, with their inner edges higher than their outer edges. This provides space for gradually deepening or tapering the draft sills of the car as indicated in Fig. 5, and in the case of the cross bolster 28 forms a convenient way of tapering the opening 32 for the accommodation of the vertically tapering end 44 of the longitudinal bolster.

The central portion of the longitudinal bolster 29 is constructed as follows: At 45, is a circular, flat bottom center bearing plate with a separate co-acting saddle plate 46 resting thereon. The bottom face of the plate 46 is made flat and circular so as to conform to and rotate on the surface of the plate 45. The upper surface 47 of the plate 46 is made convex, and in reality constitutes a portion of a cylinder, the axis of the same being transverse of the truck. The plate 48 secured to the car body is made concave to accommodate the cylindrical form of the surface 47 thus the plate 48 may revolve partially about the surface 47 longitudinally of the car to allow for angularity of the trucks and car body on vertical curves, the rotatable relationship of the surfaces 45 and 46 allowing for angularity due to horizontal curvature of the track. At the same time, when the car body tilts sidewise or rocks on the side bearings it will always return to its normal position.

The center bearing plate is suitably supported on a pair of flanged beam members 49 which are disposed longitudinally of the car and span over the middle axle. These are in turn supported upon a pair of transversely disposed flanged beam members 50 which are disposed along either side of the middle axle and all of which are made in the one integral casting. In turn, these extend to and are supported by the main longitudinal bolster member 42. The beam members 49 and 50 are preferably located so that their webs fall within the lines of the circle of the center plate so that there are formed chordal braces under each quarter of the same. This construction stiffens and supports the center plate against the severe and concentrated loads to which it is subjected, as for example, in rocking on the side bearings. At the same time the metal forming the floor of the center plate serves also as the top flange material for these beam members, the floor of the center plate and the top flange of these beam members being in the same plane.

The beam members 49 and 50, and especially the members 50 are, as has been stated, sections with top and bottom flanges, and I have provided a peculiar and improved method of joining the ends of the members 50 to the flanged members 42. The lower flange 51 of a beam 50 is lower than the bottom flange of the member 42. It is carried out preferably under this flange and then turned up and joined to the under face of the same at 52. The top flange 53 of the member 50 is carried directly outward and joined to the web of the member 42 between the flanges thereof.

The lower flanges of the beam members 49 are higher than those of the beams 50 and these flanges continue outward and terminate in the webs of the members 50 being cast thereto in a single piece.

While in the drawings certain portions of truck brakes are disclosed, the present application does not attempt to include all of these brake features, portions of which will be made the subject of a future application for Letters Patent in that art.

The special features of my truck, however, that relate to the necessary adjuncts of a truck in order that it may receive brakes are included herein and will now be set forth. In six-wheel trucks of this character it has heretofore been customary to support the brakes from brackets extending outward from the side frames.

In my construction I provide the side frames with pockets 54 and 55, these having their inner faces open and their outer faces substantially closed. These may be below the spring seats of the side frames. Extending across the truck from side frame to side frame are cross bars 56 and 57 which carry brake hanger brackets 58 and 59. These brackets being carried by the crossbars have no material movement with respect to the frames, the pockets restraining the cross bars against axial movement as well as movement in any plane. The cross bars are simply inserted within these open side pockets and the frames drawn up into place. When the keepers 60 are applied to the outer ends of the cross bolsters the side frames cannot part and consequently the bars 56 and 57 cannot get out of place. At the same time the brake hangers have no rigid connection, as by casting or riveting, with the side frames so that brake forces will be transferred to the frames as direct vertical loads without the usual side forces that accompany the vertical loads.

The cross bar 56 is made of cast metal with the bracket 58 integral. The central portion of this bar is provided with ways or guides 61 for the brake members 62. The cross bar 57 is made of a commercial I beam laid the flat way, that is with the web horizontal. The bracket 59 is riveted to the web of this I and has a portion 63 extending outwardly and supplementing the I to fill out the pocket 55. This cross bar 57 carries at its central portion a cable guard 64 which is a shaped plate overlapping the depending flanges of the I. Such a guard is required at points where a cable is used to haul cars up an incline and the I beam cross tie thus transfers the forces of this uplift of the cable to the side frames. To the one edge of this I, near the center is affixed a bracket 65 which serves as a brake lever fulcrum. This I beam crossbar thus transfers the brake fulcrum forces to the side frames. These cross bars extend across the truck beneath the brake beams and beneath the cross bolsters, the brake hanger brackets extending upwardly as between the backs of adjacent beams 66 and then extending outwardly over the beams. From these points swinging hangers 67 extend downwardly to directly support the brakes. In trucks of this character it is necessary to supply side bearings such as 68 and these may be carried on bars or beams 69 extending from cross bolster to cross bolster. These are located preferably just inside of the middle truck wheels. The bars 69 rest on the cross bolsters, preferably on the top flanges thereof in suitable retaining pockets and these bearing points are so arranged that the parts are not rigidly secured together as by bolting or riveting but simply rest one upon the other to allow the necessary movement or flexibility to secure the vertical articulation between the two cross bolsters with respect to a horizonal plane.

In order that the stability of the bars 69 with respect to a vertical plane may be assured there are provided extensions such as 70 from one or more of the members at their supporting points and these are adapted to contact the other member and secure the arched bars 69 against tilting transversely of the car. These extensions 70 in the present embodiment are made in the form of extended feet cast out from the bars 69, the effect of which is to widen the bearing of these parts upon the top flanges of the transverse bolster, by means of which construction the bars 69, while readily permitting the necessary flexibility of the bolster construction, will be retained in their vertical positions.

I have thus described the features of the present invention. And while the present embodiment constitutes a complete and practical truck yet it is fully appreciated that various changes and alterations may be made in other embodiments, within the scope of the appended claims without departing from the spirit of my invention.

I claim:

1. In a car truck, a pair of over-reaching frame members disposed along one side of the truck and articulated with respect to each other, one of said frame members being bifurcated at its inner end for a portion of its depth but not for its full depth and accommodating between the resulting portions the adjacent end of the other frame member.

2. A car truck having a pair of over-reaching frame members connected together and articulated with respect to each other, one of said frame members having side walls at its ends spaced apart at the top but connected at the bottom and the adjacent end of the other frame member being disposed between the said spaced side walls.

3. A car truck having a rigid side frame and an over-reaching articulated side frame connected thereto and supported thereby at one end, the rigid side frame being provided with spaced side walls and the over-reaching portion of the articulated side frame being disposed between said spaced side walls.

4. A car truck having articulated and over-reaching side frames, at least one of which has a top member of channel shape in cross section with the web turned horizontally and with normally depending flanges, the flanges of the channel being extended upward along either side of the frame and forming a way for the adjacent side frame.

5. A car truck having over-reaching side members, one of which is formed with the top member of channel shape in cross section, the web of the channel being disposed horizontally and being diverted from its normal path to provide a pocket for the adjacent over-reaching side member.

6. A car truck having a pair of side members, one supported upon the other, the supporting member being of channel shape in cross section with the web disposed horizontally and the flanges depending therefrom, the web being downwardly convoluted from its normal path at the point of support whereby is formed a supporting pocket with the channel flanges as side walls.

7. A car truck having over-lapping side members and means carried by the same and at a point removed from the extremity of one of said members for limiting the transverse motion between the said side members.

8. A car truck having a pair of side members, one supported upon the other, and means carried by one of said members for limiting the relative transverse movement between the two members, said means being located at a point removed from the point of support of the one member upon the other.

9. A car truck having articulated side members, one of which overlaps the other and is supported thereby, the overlapped member being provided with spaced side walls which form a longitudinal pocket, the overlapping member being disposed within the said pocket, and there being extensions outward from one of said members within the pocket for limiting the transverse movement between the two members.

10. A car truck having a side frame with one of the members thereof of channel shape in cross section, the web of the channel being disposed horizontally and the flanges vertically, the web being diverted locally from its normal path to form a pocket with the flanges as side walls, and outstanding flanges formed on the flanges of the channel without the pocket and substantially in the normal line of the channel web.

11. A car truck having side members supported one upon the other, the supporting member having upwardly extending side walls pierced transversely of the same with an arcuately curved bottom wall extending therebetween, the supported member being disposed between said walls and having a coöperatively formed bottom face which bears upon the said bottom wall, the supported member being provided with a co-alining pierced hole and there being a pin disposed therethrough and connecting together the said side members, the arc of the said curved bottom wall being struck about the axis of the said holes as a center.

12. A car truck having side members supported one upon the other and having pivoted movement with respect to each other, said members being provided with alining holes and there being a pin extending through the holes and connecting together the said members, the hole through the one member being elongated in a direction to allow shifting of the pin in said hole in a substantially vertical direction.

13. A car truck having a pair of side members, one of which overlaps and is hingedly connected to the other one, a pivot pin extending through coalining openings in the said members, there being clearances provided between the two members to allow a limited amount of pivoted motion between the same before contacting one with another, the opening in one of said members being elongated to allow displacement of the pivot center when the said members contact.

14. A car truck side frame having a bolster window opening therein, the same being defined at the top and bottom by substantially horizontal compression and tension members respectively and at the sides by vertical struts, top and bottom arch members extending outwardly from the horizontal window opening members and converging and being joined together at their ends, a diagonal tie member extending from near the middle of the bottom arch member to a point over the adjacent window-opening strut, a plurality of triangularly shaped openings at one side of the said window opening, one of the same being defined by the bottom arch member, the adjacent window opening strut and the diagonal tie member, and another by the bottom arch member, the diagonal tie member and the top arch member.

15. A car truck side frame having a bolster window opening therein, the same being defined at the top and bottom by substantially horizontal compression and tension members respectively and at the sides by vertical struts, top and bottom arch members extending outwardly from the horizontal window opening members and converging and being joined together at their ends, one of said arch members having a bend near its center and there being a diagonal tie member extending from said bend to the junction of the other arch member, horizontal window opening member and a vertical strut member.

16. A car truck side frame having a bolster window opening therein, the same being defined at the top and bottom by substantially horizontal compression and tension members respectively and at the sides by vertical struts, top and bottom arch members extending outwardly from the horizontal window opening members and converging and being joined together at their ends, the bottom arch member being bent near its center and a diagonal member extending from said bend upwardly and backwardly to the top of the adjacent window opening strut member and being adapted to tie and brace the said points together.

17. A car truck having a side frame with a bolster opening therein, the said opening being defined at the sides by spaced vertical members the opposing faces of which are flattened to form bolster guides, the inner edges of the same being shaped to serve as bolster stops, a bolster having its end disposed through said bolster opening, said bolster being of I section at the end, with the flanges horizontal and the web vertical, the said end of the bolster being provided with additional side walls which extend vertically from flange to flange and are formed to provide coöperating surfaces for the said flattened faces of the bolster opening, the said side walls terminating at their inner ends in angular portions which extend around the said vertical members of the side frame and are there formed to contact with and coöperate with the inner edges of the same as bolster stops.

18. A car truck having a side frame with a bolster opening therein, the said opening being defined at the sides by spaced vertical members, the opposing faces of which are flattened to form bolster guides, the inner edges of the same being shaped to serve as bolster stops, a bolster having its end disposed through said bolster opening, said bolster being of I section at the end, with the flanges horizontal and the web vertical, the said end of the bolster being provided with additional side walls which extend vertically from flange to flange and are formed to provide coöperating surfaces for the said flattened faces of the bolster opening, the said side walls being extended around the said vertical members of the side frame and being there formed to contact with and coöperate with the inner edges of the same as bolster stops, the said side walls being extended below the bottom flange of the bolster.

19. A car truck having a side frame with a bolster window opening therein, the said faces of the said window opening being flattened to form bolster guide plates, a spring seat at the bottom of said window opening, springs supported on said spring seat, a bolster, the end of which extends through said window opening and rests upon the said springs, the end of the said bolster having top and bottom flanges with side walls connecting the same together and forming guide plates for coöperation with the window opening guide plates, extensions from said side walls below the bottom flange of the said bolster, the said springs being disposed beneath the bottom flange of the said bolster and between the said side wall extensions thereof.

20. In a car truck, a load supporting bolster disposed longitudinally of the truck, a cross bolster having an opening therein to receive and support the end of the said longitudinal bolster, the said opening being broadened out at the side adjacent the center of the said longitudinal bolster and being narrower at the opposite side, the end of the said longitudinal bolster being tapered to conform to the shape of the said opening.

21. In a car truck, a bolster of I section with the web thereof vertical and with horizontal top and bottom flanges, a transverse opening in the web of the said bolster, an additional horizontal flange extending under the said opening and being widened out to serve as a load-receiving seat, the said additional flange being tapered off and disappearing into the web of the I beyond the limits of the said opening.

22. In a car truck, a bolster of I section with the web thereof vertical and with horizontal top and bottom flanges, a transverse opening in the web of the said bolster, an additional horizontal flange extending under the said opening and being widened out to serve as a load-receiving seat, the said additional flange being tapered off and disappearing into the web of the I beyond the limits of the said opening, and vertical flange members defining the sides of the said opening and extending upwardly from the said additional horizontal flange.

23. In a car truck, a bolster of I section with the web thereof vertical and with horizontal top and bottom flanges, a transverse opening in the web of the said bolster, an additional horizontal flange extending under the said opening and being widened out to serve as a load-receiving seat, the said additional flange being tapered off and disappearing into the web of the I beyond the limits of the said opening, outstanding flange members defining the said opening above the said additional horizontal flange, and brackets extending from the main bottom flange of the bolster to the said additional horizontal flange.

24. In a car truck, a longitudinal bolster, a transverse bolster supporting an end of the same, the said transverse bolster having continuous top and bottom flanges and an opening in its side adapted to receive the end of the said longitudinal bolster and having spring seats at its ends beneath the bottom flange, the said transverse bolster being depressed at its center out of a normal path with relatively higher ends, the plane of the spring seats being above the plane of the said longitudinal bolster seat and substantially on line with the top of the depressed central portion of the said transverse bolster.

25. In a car truck, a longitudinal bolster, a flanged transverse bolster supporting an end of the same, the said transverse bolster having an opening in its side adapted to receive the end of the longitudinal bolster, springs supporting the ends of the transverse bolster, the same being disposed beneath the bottom flange thereof, the said transverse bolster being depressed at its central portion below the spring seats thereof and the longitudinal bolster opening being in said depressed portion.

26. In a car truck, a bolster member disposed longitudinally of the car, transversely disposed bolsters located at spaced intervals along either side of the center of the truck and supporting the ends of the longitudinal bolster, the upper face of at least one of the transverse bolsters being higher at the side thereof next the truck center than at the opposite side.

27. In a car truck, a load supporting bolster disposed transversely of the car and removed longitudinally of the car from the center of the truck and having top and bottom flanges, the top flange thereof being formed with its central portion on a plane inclined longitudinally of the car toward the truck center.

28. In a car truck, a bolster extending longitudinally of the car, a transverse bolster supporting an end of the same, an opening in the side of the said transverse bolster adapted to receive the end of the longitudinal bolster, the said longitudinal bolster being tapered within the lines of the cross bolster from a greater depth toward its central portion to a less depth at its end, the opening in the said transverse bolster being similarly tapered from a greater height at its adjacent to a less height at the side removed from the center of the longitudinal bolster.

29. In a car truck, a load supporting bolster with top and bottom flanges, supporting members therefor, window openings in said supporting members, the ends of the said bolster being disposed within the said openings, the bottom flange of the said bolster extending horizontally within the said opening and being then diverted downwardly toward the center of the bolster, the top flange thereof extending inwardly from its outer end on an upwardly inclined plane through the said opening and being then also diverted downwardly toward the center of the bolster.

30. In a car truck, three axles with their customary wheels and oil boxes, a center bolster adapted to receive the load from the car body, supporting cross bolsters for the same extending transversely of the car, one at either side of the middle truck wheels, the said center bolster, embodying substantially parallel members originating at and supported upon one cross bolster, extending longitudinally of the car inside of the truck wheels and being humped over the middle truck axle, the said members then converging and being joined together on the longitudinal center line of the truck and being there supported by the other cross bolster, all in combination with means for transferring loads from the said cross bolsters to the said oil boxes.

31. In railway car and truck construction, a car body having a floor and having centrally disposed draft sills extending beneath the same, a truck for said car, the same including a load supporting center bolster with parallel members extending longitudinally of the car along either side of the draft sills, cross bolsters supporting the said center bolster, the same extending transversely of the car and passing beneath the draft sills, the corresponding ends of each of the said parallel members being supported at spaced points on one cross bolster, the other ends of the said parallel members being dropped downwardly and curved inwardly beneath the said draft sills and converging and being joined together at the center of the other cross bolster and supported thereby, means for transferring the load of said car to the said bolster construction and therefrom to the rail.

32. In a car truck, side frames at each side of the truck, a plurality of wheels, axles and oil boxes, the said side frames being supported by the said oil boxes, a load supporting bolster having means thereon for receiving the load from the car body, the said bolster comprising a cross bolster and a combined cross bolster and center bolster, the said cross bolster being supported upon the said side frames, the said combined cross bolster and center bolster being supported at one end on the first cross bolster and at the other end on the side frames.

33. In a car truck, three axles with the customary wheels and oil boxes, an integral, cast metal bolster construction comprising a center bearing plate, flanged supporting members therefor disposed longitudinally of the car and spanning over the middle axle, flanged transverse beam members disposed along either side of the middle axle and supporting the ends of the said longitudinal members, the top flanges thereof being in the same plane and the metal of the floor of the center bearing plate forming also the upper flanges of the beam members, the bottom flanges of the said longitudinal beam members being higher than the bottom flanges of the transverse beam members, and the same terminating in and being cast to the webs of the transverse members, and means for transferring the loads therefrom to the oil boxes.

34. In a car truck, three axles with the customary wheels and oil boxes, an integral, cast metal bolster construction comprising a center bearing plate, flanged supporting members therefor disposed longitudinally of the car and spanning over the middle axle, flanged transverse beam members disposed along either side of the middle axle and supporting the ends of the said longitudinal members, the top flanges thereof being in the same plane and the metal of the floor of the center bearing plate forming also the upper flanges of the beam members, the bottom flanges of the said longitudinal beam members being higher than the bottom flanges of the transverse beam members, and the same terminating in and being cast to the webs of the transverse members, additional flanged longitudinal beam members supporting the ends of the said transverse members, and means for transferring the loads therefrom to the oil boxes.

35. In a car truck, a bolster having an integral, circular, load receiving center bearing plate, a pair of longitudinal and a pair of transverse flanged beam members cast together therewith, one pair supporting the other and both pairs supporting the center plate, the said members being located so as to provide a chordal brace under each quarter of the center plate and within the lines of the same, the floor of the center bearing plate forming the upper flanges of the beam members, the bottom flanges of one pair of said beam members being higher than the corresponding flanges of the other pair of beam members, and the same terminating in and being cast to the webs of the last said beam members, together with means for transferring the loads therefrom to the rail.

36. In a car truck, a center bolster comprising a pair of flanged, parallel members extending longitudinally of the truck and spaced apart, flanged transverse members extending therebetween and being joined thereto, the respective flanges of the said transverse members being lower than the corresponding flanges of the longitudinal members, the bottom flanges of the transverse members extending under and being turned up and joined to the under faces of the bottom flanges of the longitudinal members.

37. In a car truck, a center bolster comprising a pair of flanged, parallel members with vertical connecting webs, said members extending longitudinally of the truck and spaced apart, flanged transverse members extending therebetween and being joined thereto, the respective flanges of the said transverse members being lower than the corresponding flanges of the longitudinal members, the bottom flanges of the transverse members being curved upwardly and joined to the bottom faces of the lower flanges of the longitudinal members and the top flanges of the transverse members extending directly outwardly and being joined to the webs of the parallel members.

38. In a car truck, side frames at each side of the truck, a cross bar extending from one to the other thereof and being supported thereby, said cross bar carrying a cable guard and a brake lever fulcrum.

39. In a car truck, side frames at each side of the truck, inwardly facing pockets therein, a bolster extending from side frame to side frame and having interlocking engagement therewith whereby the side frames may be prevented from spreading, and a cross bar extending from side frame to side frame with the ends thereof disposed within the said pockets.

40. In a car truck, a bolster having a pair of transverse bolster members disposed transversely of the truck, a longitudinal bolster member spanning from one transverse bolster member to the other and being supported thereby, the said transverse bolster members being articulated in a horizontal plane with respect to each other, a side bearing member extending from one transverse bolster member to the other and being flexibly supported on the upper faces thereof in such manner as to allow the said articulation of the transverse bolster members, there being extensions cast out from one of the members at the point of support and adapted to contact with the other member whereby the said side bearing member may be secured against tilting transversely of the truck.

41. In a car truck, three axles with their customary wheels and oil boxes, a bolster therefor the same having a load supporting member disposed longitudinally of the truck, a pair of transverse bolster members disposed across the truck at either side of the middle wheels thereof, the same supporting the ends of the longitudinal bolster member and having relative vertical movement with respect to each other, side bearing members disposed longitudinally of the truck along either side of the longitudinal bolster member and within the lines of the middle truck wheels, the said side bearing members being arched over the middle axle and extending from one to the other of the transverse bolster members and being supported upon the top walls thereof in such manner as to allow the said relative vertical movement of the transverse bolster members, there being means carried by one of the members at the said point of support to contact the other whereby the said side bearing member will be held in its normal vertical plane, means for imparting the load of the car body to the bolster members and means for transferring it therefrom to the oil boxes.

42. In a car truck, a bolster construction having vertical flexibility, the same comprising a member disposed longitudinally of the truck and a pair of transverse members adapted to support the ends of the longitudinal member, side bearing members extending longitudinally of the truck along either side of the longitudinal bolster member and being supported at their ends upon the top faces of the transverse bolster members, the side bearing members being yieldably supported thereon with respect to a horizontal plane but being restrained thereon with respect to a vertical plane.

43. In railway car and truck construction, a load-receiving center bearing plate arrangement, there being a circular flat faced center plate carried by one member and a cylindrically curved plate by the other member, and there being a separate plate inserted therebetween having faces formed to correspond with and accommodate the respective faces of the first two said center plates.

44. In railway car and truck construction, a load-receiving center bearing plate arrangement, there being a circular flat faced center plate carried by one member and a cylindrically curved plate by the other member, and there being a separate plate inserted therebetween having faces formed to correspond with and accommodate the respective faces of the first two said center plates, the axis of the cylinder extending transversely of the car and truck.

45. In railway car and truck construction, a circular flat faced center plate carried by the truck, the same occupying a horizontal plane and facing upwardly, a cylindrically curved plate carried by the car body, the same facing downwardly and the axis thereof extending transversely of the car and truck, and a separate plate between the said flat and curved plates, the same having its opposite faces formed to correspond with and coact with the adjacent faces of the other center plates.

In testimony whereof I affix my signature in presence of two witnesses.

BYERS W. KADEL.

Witnesses:
R. B. KORTE,
A. K. SIMMONS.